United States Patent
Chang

(10) Patent No.: US 9,644,353 B1
(45) Date of Patent: May 9, 2017

(54) FAUCET WITH PIPE-IN-PIPE STRUCTURE

(71) Applicant: Chia-Po Chang, Changhua (TW)

(72) Inventor: Chia-Po Chang, Changhua (TW)

(73) Assignee: Hain Yo Enterprises Co. Ltd., Changhua (TW)

( * ) Notice: Subject to any disclaimer, the term of this patent is extended or adjusted under 35 U.S.C. 154(b) by 16 days.

(21) Appl. No.: 14/976,341

(22) Filed: Dec. 21, 2015

(51) Int. Cl.
*E03C 1/04* (2006.01)
*F16K 27/04* (2006.01)
*E03C 1/02* (2006.01)

(52) U.S. Cl.
CPC .......... *E03C 1/0404* (2013.01); *E03C 1/0412* (2013.01); *F16K 27/041* (2013.01); *E03C 2001/026* (2013.01)

(58) Field of Classification Search
CPC ................ E03C 1/0404; E03C 1/0412; E03C 2001/026; E03C 1/023; Y10T 137/87249; Y10T 137/9464; F16K 27/041
USPC .................................. 137/597, 801; 210/449
See application file for complete search history.

(56) References Cited

U.S. PATENT DOCUMENTS

| | | | | |
|---|---|---|---|---|
| 5,205,313 A * | 4/1993 | Moretti | ................... | F16K 35/14 137/112 |
| 5,293,901 A * | 3/1994 | Guzzini | .................... | E03C 1/04 137/595 |
| 5,983,938 A * | 11/1999 | Bowers | ................... | C02F 1/003 137/625.17 |
| 2003/0121553 A1* | 7/2003 | Kuo Liao | ............. | F16K 11/056 137/625.47 |
| 2006/0162793 A1* | 7/2006 | Di Nunzio | .......... | F16K 11/0787 137/625.46 |
| 2006/0266424 A1* | 11/2006 | Filtness | ................. | E03C 1/0403 137/625.4 |

* cited by examiner

*Primary Examiner* — Michael R Reid
(74) *Attorney, Agent, or Firm* — Che-Yang Chen; Law offices of Scott Warmuth

(57) ABSTRACT

A faucet with pipe-in-pipe structure may include a control valve and a valve shell, and a rotating base, a sliding valve piece, and a fixing valve piece are sequentially formed inside the valve shell. The rotating base has a valve rod outwardly sticking out of the valve shell to connect to a handle. The valve rod operated by a handle can rotate the rotating base with the sliding valve piece, so that relative positions between the sliding valve piece and the fixing valve piece are controlled to operate the on/off operation of the faucet, the mixing ratios of hot water and cold water, and the amount of water flow. A valve base connected to a lower end of the valve shell is configured to prevent the fixing valve piece, the sliding valve piece and the rotating base from falling out of the valve shell.

8 Claims, 13 Drawing Sheets

FAUCET WITH PIPE-IN-PIPE STRUCTURE

FIELD OF THE INVENTION

The present invention relates to a faucet with pipe-in-pipe structure and more particularly to a faucet to achieve open/close operation of tap water and filtered water by controlling the aligning positions of valve pieces inside the faucet.

BACKGROUND OF THE INVENTION

Generally, the conventional faucet with pipe-in-pipe structure (as shown in FIG. 16) comprises a faucet body (70), which has a water inlet chamber (71) and a water outlet chamber (72) respectively formed at a bottom portion and a top portion of the faucet body (70). A valve channel (73) formed at a lateral side of the faucet body (70) is configured to provide loading for a control valve (80). A central bottom portion of the valve channel (73) has two cold and hot water inlet tubes (74) and a filtered water inlet tube (75) to receive cold and hot water sources and a filtered water source respectively, and a tap water outlet hole (76) and a filtered water outlet hole (77) upwardly penetrate a bottom of the water outlet chamber (72) respectively. The water outlet chamber (72) has a water outlet tube (90), and the water outlet tube (90) further comprises an outer tube (91) and an inner tube (92) which is formed inside the outer tube (91). In actual application, the faucet can provide tap water by rotating a handle, which is connected to the control valve (80) of the faucet, in one direction. By rotating the handle with different angles, the faucet can provide cold water, hot water, or different mixing ratios of hot water and cold water which are pre-mixed in the ceramic control valve (80). Also, since the tap water outlet hole (76) is connected with the outer tube (91) of the water outlet tube (90), cold water, hot water or warm waters from different mixing ratios of cold water and hot water can flow out of the faucet through the outer tube (91). On the other hand, the faucet can provide the filtered water by rotating the handle in the other direction. The filtered water can flow from the filtered water inlet tube (75) through the valve channel (73) into the control valve (80), and flows from the filtered water outlet hole (77) of the control valve (80) through the inner tube (92) of the water outlet tube (90) out of the faucet.

However, the conventional faucet is disadvantageous because: (i) when the faucet body (70) of the conventional faucet is casted, it still needs to have a second manufacturing process for the cold and hot water inlet tubes (74), the filtered water inlet tube (75), the tap water outlet hole (76), and the filtered water outlet hole (77), resulting in increasing the difficulty and cost of production process; and (ii) the conventional faucet can only be used after the water inlet chamber (71), the water outlet chamber (72), the cold and hot water inlet tubes (74), the filtered water inlet tube (75), the tap water outlet hole (76) and the filtered water outlet hole (77) are settled inside the faucet body (70). As a result, it increases the complexity of channels inside the faucet body (70) and the difficulty of subsequent manufacturing process. Therefore, there remains a need for a new and improved design for a faucet with pipe-in-pipe structure to overcome the problems presented above.

SUMMARY OF THE INVENTION

The present invention provides a faucet with pipe-in-pipe structure, which comprises a control valve and a valve shell, and a rotating base, a sliding valve piece and a fixing valve piece are sequentially formed inside the valve shell. The rotating base has a valve rod outwardly sticking out of the valve shell to connect to a handle. The valve rod operated by the handle can rotate the rotating base with the sliding valve piece, so that relative positions between the sliding valve piece and the fixing valve piece are controlled to operate the on/off operation of the faucet, the mixing ratios of hot water and cold water, and the amount of water flow. A valve base connected to a lower end of the valve shell is configured to prevent the fixing valve piece, the sliding valve piece and the rotating base from falling out of the valve shell. The control valve is cooperatively used with a faucet unit, a water outlet tube and the handle. A first water sink and a water mixing chamber are respectively formed on an upper surface of the sliding valve piece in a concave way. The first water sink located at a central portion of the sliding valve piece comprises a first sink portion and a second sink portion, and the water mixing chamber shaped into an arc-shaped is located at an outer periphery of the first water sink. A lower end surface of the first water sink and a lower end surface of the water mixing chamber respectively bear against an upper surface of the fixing valve piece, so that the sliding valve piece can be driven by the rotating base to rotate inside the valve shell. A second water sink formed on the upper surface of the fixing valve piece has a concave third sink portion and a concave fourth sink portion, and a first filtered water inlet penetrates through the fourth sink portion. A lower surface of the fixing valve piece is borne against the valve base, and thus the fixing valve piece can be secured by engaging portions of the valve base. A second filtered water inlet and a tap water inlet respectively penetrate through a central portion of the fixing valve piece, and each of a cold water flowing hole and a hot water flowing hole is respectively formed at two lateral sides of the central portion of the fixing valve piece. The valve base comprises a main portion which is formed inside the valve shell to provide blocking effect for the fixing valve piece, and an extending portion protruding from the valve shell has a slot-shaped water outlet chamber. The water outlet chamber comprises a first water outlet channel and a second water outlet channel, which are arranged in a sleeve structure. The main portion comprises two cold and hot water inlet holes and a filtered water inlet hole downwardly penetrating the extending portion are configured to receive cold and hot water sources and a filtered water source respectively. The main portion also comprises a tap water outlet hole and a filtered water outlet hole upwardly penetrating the water outlet chamber respectively. By respectively connecting the tap water outlet hole and the filtered water outlet hole to the first water outlet channel and the second water outlet channel, the cold and hot water and the filtered water can be separated effectively before flowing into the water outlet chamber. When the main portion of the valve base is secured on the lower end of the valve shell, the fixing valve piece can be loaded on the valve base. As a result, the two cold and hot water inlet holes, the filtered water inlet hole, the tap water outlet hole, and the filtered water outlet hole, which are formed on the valve base, can be respectively aligned with the cold water flowing hole, the hot water flowing hole, the second water sink, the tap water inlet, and the second filtered water inlet, which are formed on the fixing valve piece. The faucet unit comprises a hollow main body, and a valve cartridge base is formed at an outer periphery of the main body. The water outlet tube comprises an outer tube and an inner tube, and the inner tube is formed inside the outer tube.

Comparing with conventional faucet, the present invention is advantageous because: (i) since the main body of the faucet unit is a hollow tube, there is no need to have a second or more manufacturing processes for numerous water channels inside the faucet unit after the faucet unit is casted, resulting in simplifying the complexity in structure; (ii) since the valve base is formed integrally, the main portion, the extending portion, the first water outlet channel, the second water outlet channel, the two cold and hot water inlet holes, the filtered water inlet hole, the tap water outlet hole and the filtered water outlet hole are formed simultaneously when the valve base is formed from the mold. Therefore, there is also no need to have second or more manufacturing processes, resulting in lowering the cost; and (iii) the faucet can provide tap water with different mixing ratios of cold water and hot water, and filtered water by using a single control valve.

DETAILED DESCRIPTION OF THE INVENTION

Figure 1:
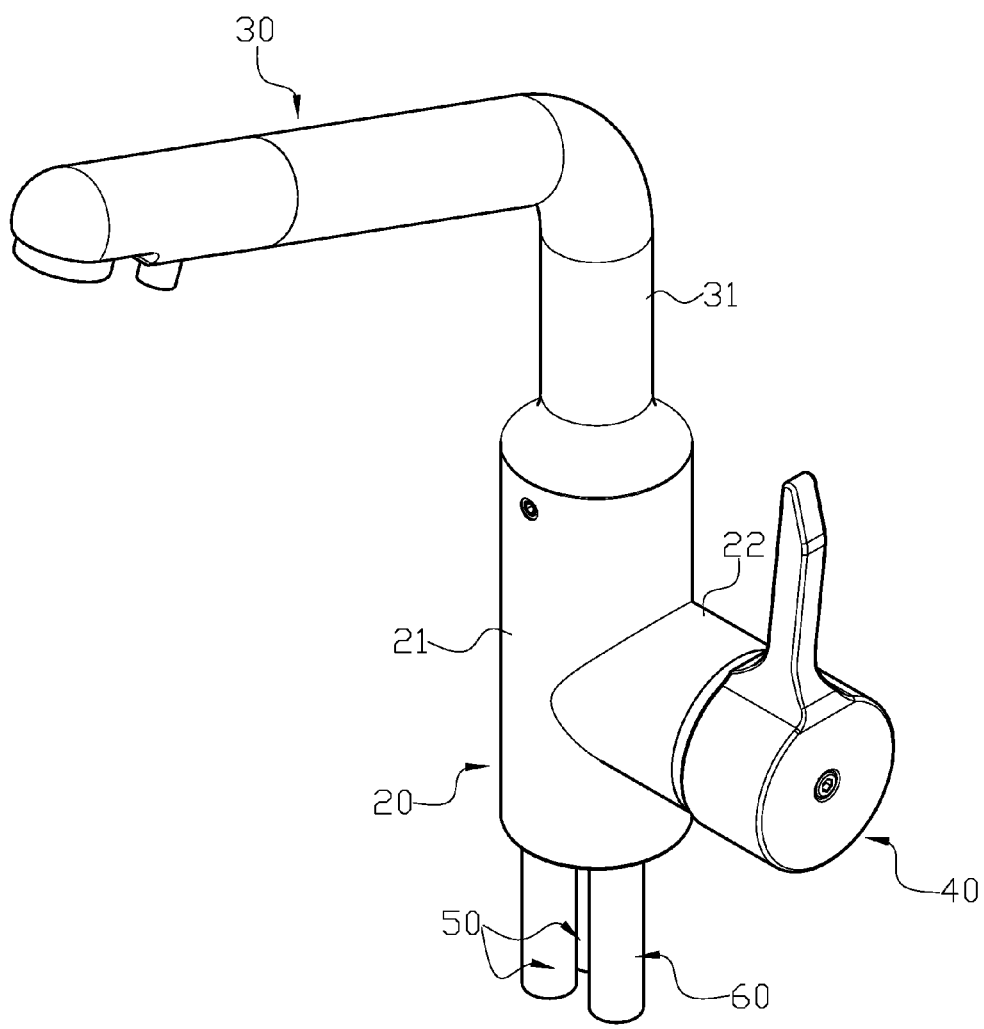
FIG. 1 is a three-dimensional assembly view of the faucet in the present invention.
Figure 2:
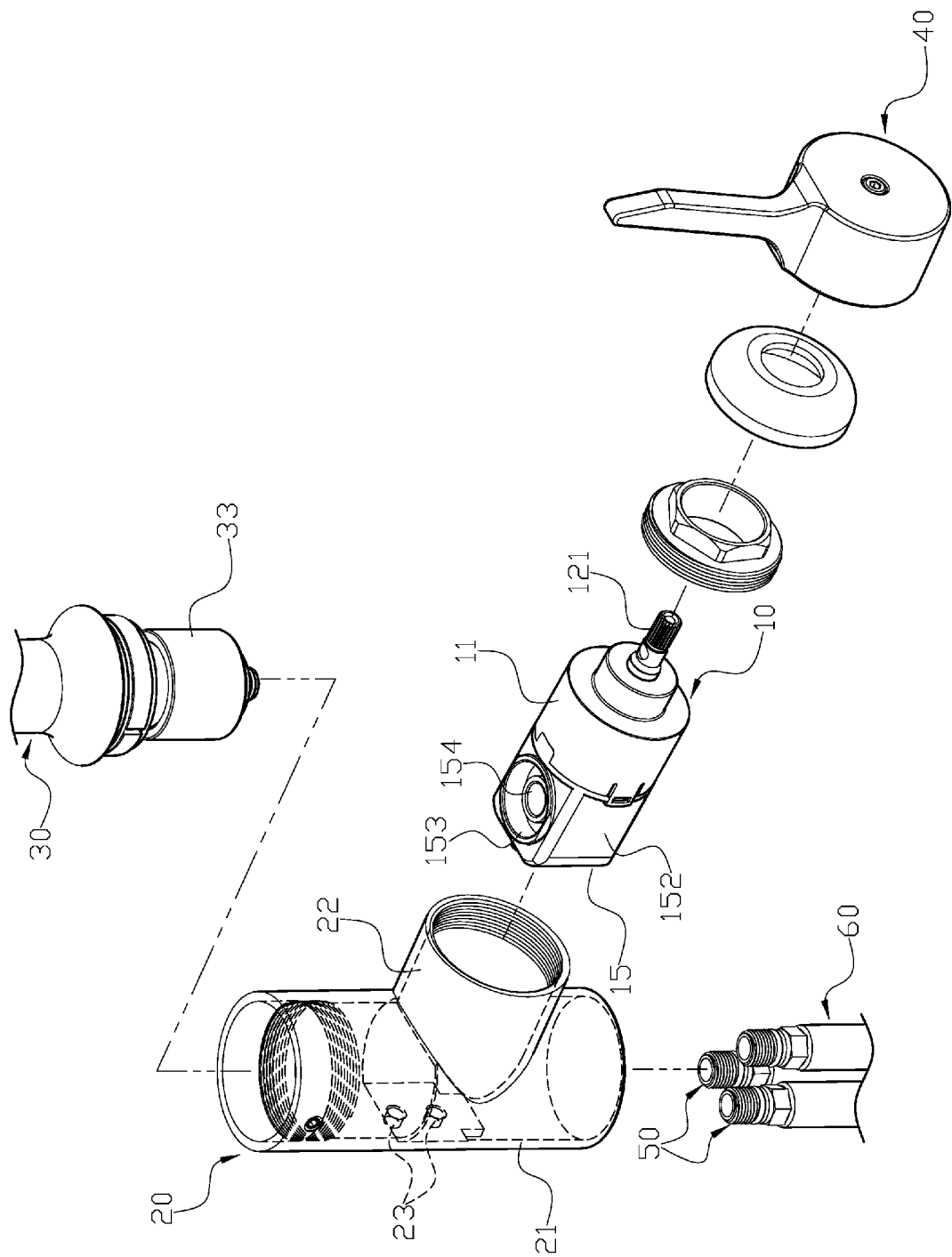
FIG. 2 is a three-dimensional, exploded view of the faucet in the present invention.
Figure 3:
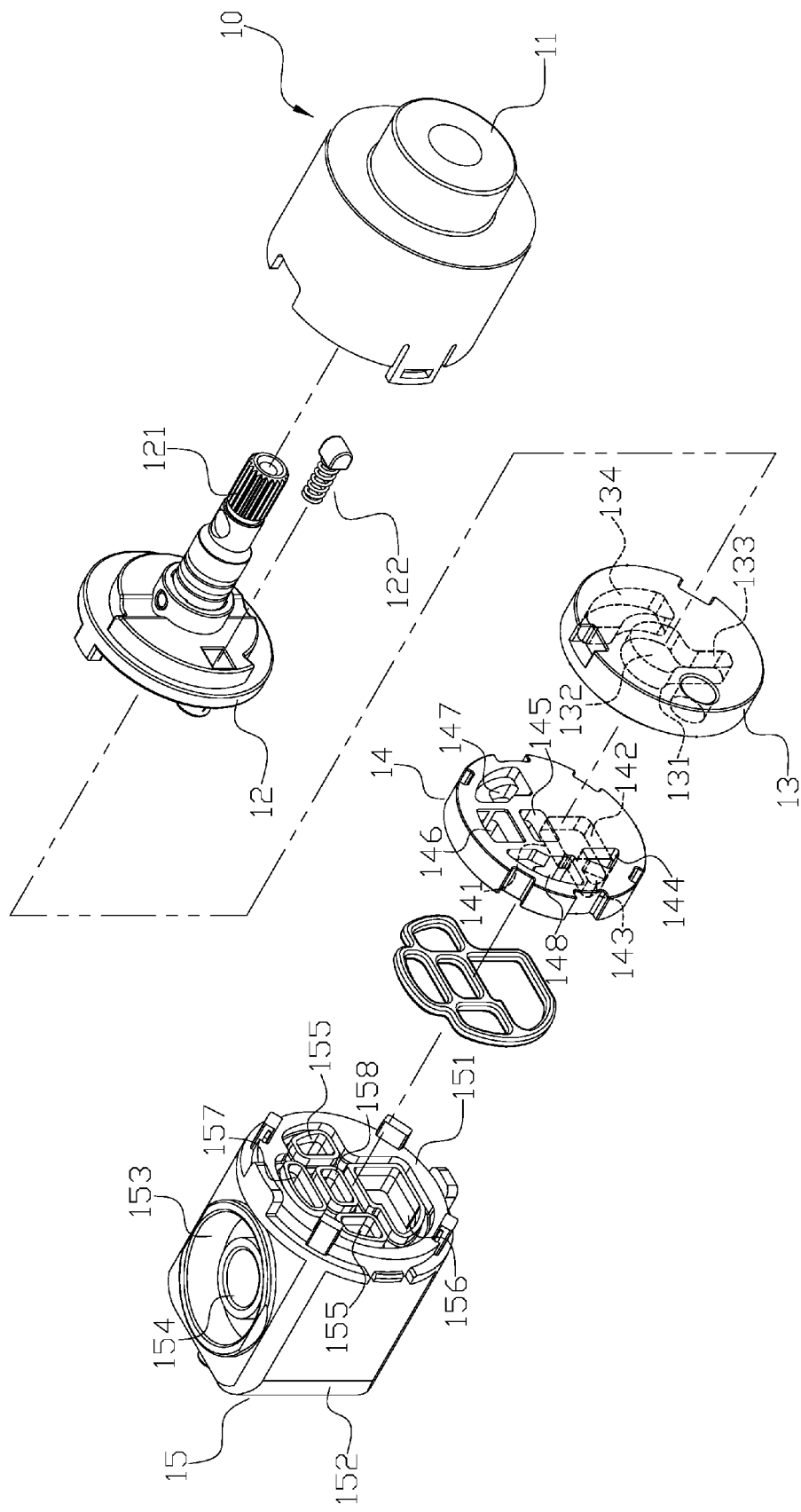
FIG. 3 is a detail exploded view of the faucet in the present invention.
Figure 4:
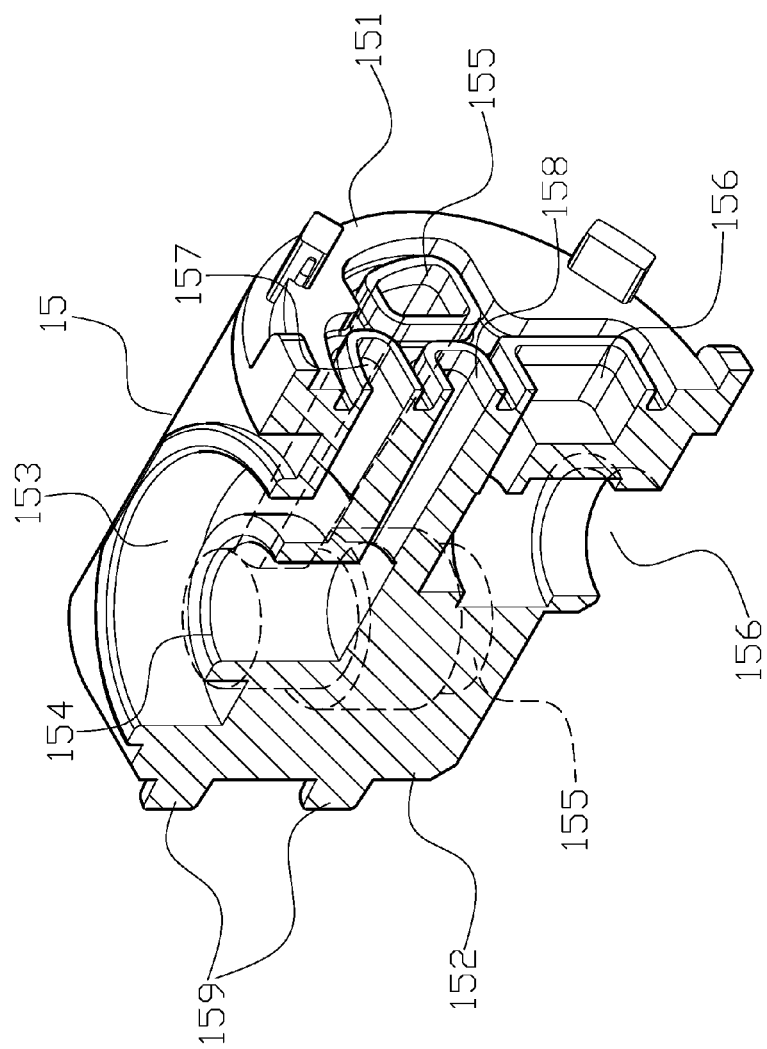
FIG. 4 is a three-dimensional, sectional view of the valve base of the faucet in the present invention.
Figure 6:
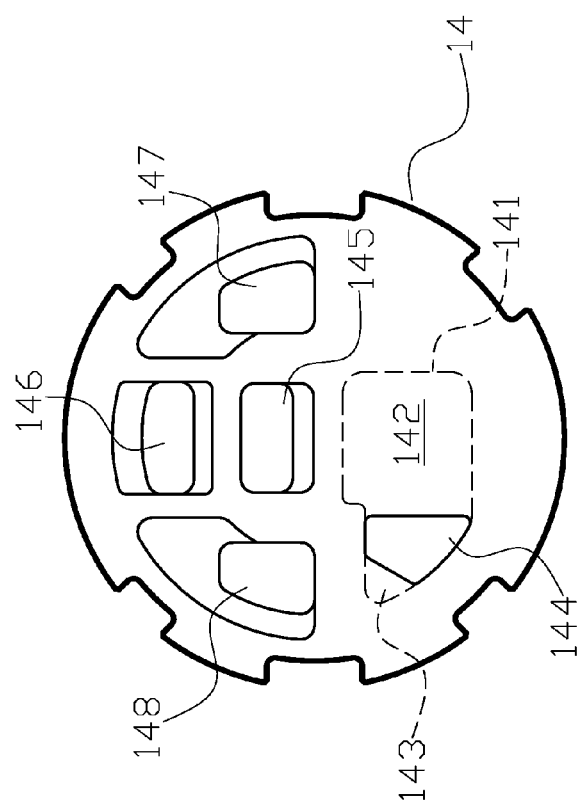
FIG. 6 is a plane view of the fixing valve piece of the faucet in the present invention.
Figure 5:
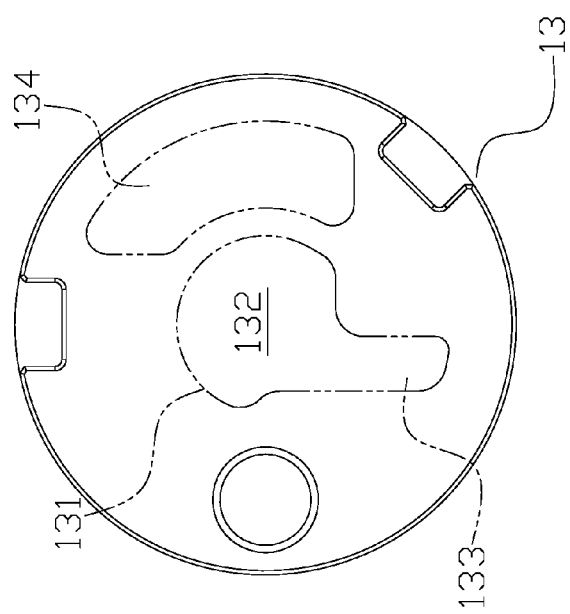
FIG. 5 is a plane view of the sliding valve piece of the faucet in the present invention.
Figure 7:
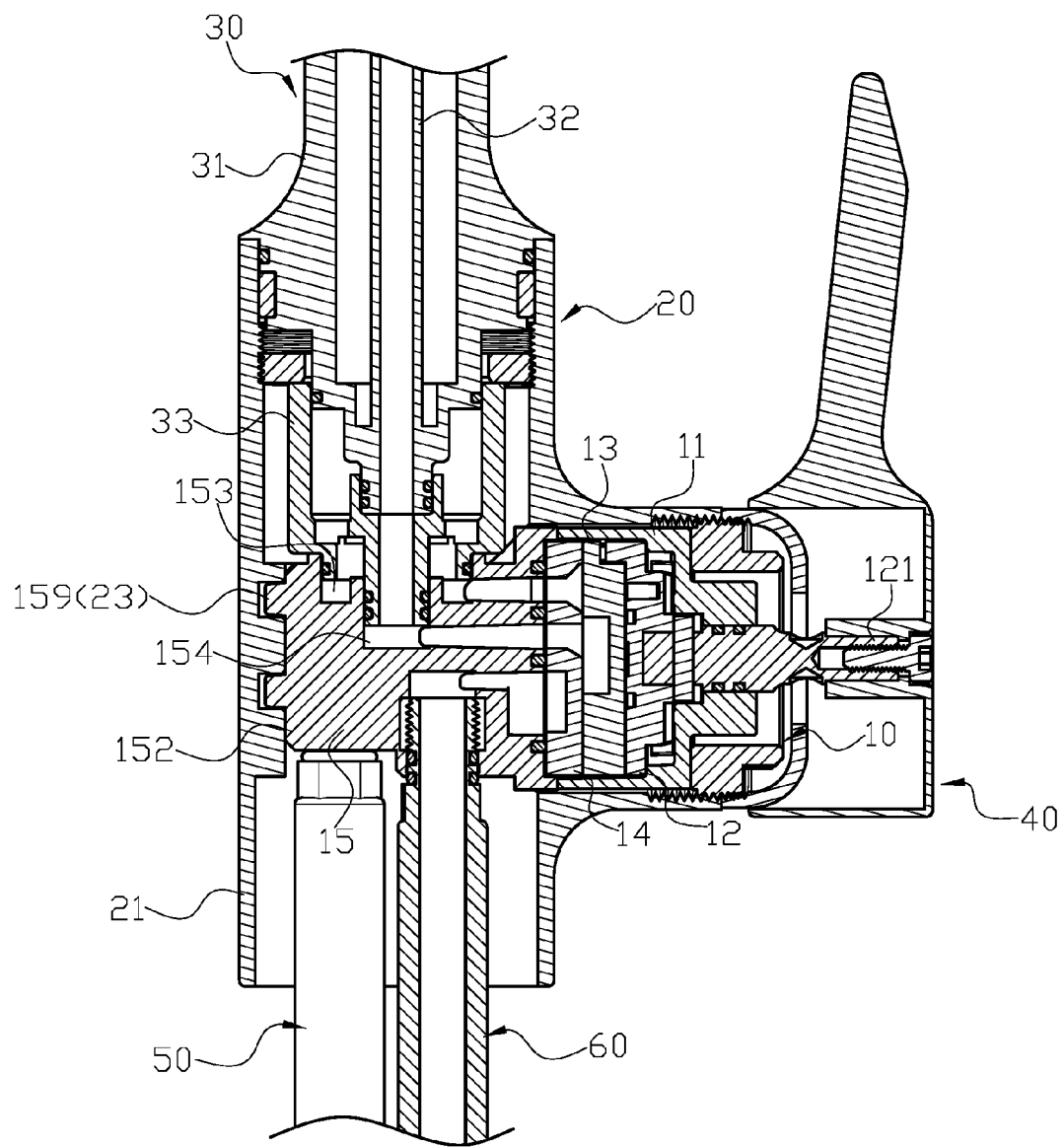
FIG. 7 is a sectional view of the faucet in the present invention when the faucet is in use.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 7, the present invention provides a faucet with pipe-in-pipe structure, which comprises a control valve (10) and a valve shell (11), and a rotating base (12), a sliding valve piece (13) and a fixing valve piece (14) are sequentially formed inside the valve shell (11). The rotating base (12) has a valve rod (121) outwardly sticking out of the valve shell (11) to connect to a handle (40). The valve rod (121) operated by the handle (40) can rotate the rotating base (12) with the sliding valve piece (13), so that relative positions between the sliding valve piece (13) and the fixing valve piece (14) are controlled to operate the on/off operation of the faucet, the mixing ratios of hot water and cold water, and the amount of water flow. A valve base (15) connected to a lower end of the valve shell (11) is configured to prevent the fixing valve piece (14), the sliding valve piece (13) and the rotating base (12) from falling out of the valve shell (11). The control valve (10) is used cooperatively with a faucet unit (20), a water outlet tube (30) and the handle (40). A first water sink (131) and a water mixing chamber (134) are respectively formed on an upper surface of the sliding valve piece (13) in a concave way. The first water sink (131) located at a central portion of the sliding valve piece (13) comprises a first sink portion (132) and a second sink portion (133), and the water mixing chamber (134) shaped into an arc-shaped is located at an outer periphery of the first water sink (131). A lower end surface of the first water sink (131) and a lower end surface of the water mixing chamber (134) respectively bear against an upper surface of the fixing valve piece (14), so that the sliding valve piece (13) can be driven by the rotating base (12) to rotate inside the valve shell (11). A second water sink (141) formed on the upper surface of the fixing valve piece (14) has a concave third sink portion (142) and a concave fourth sink portion (143), and a first filtered water inlet (144) penetrates through the fourth sink portion (143). A lower surface of the fixing valve piece (14) is borne against the valve base (15), and thus the fixing valve piece (14) can be secured by engaging portions of the valve base (15). A second filtered water inlet (145) and a tap water inlet (146) respectively penetrate through a central portion of the fixing valve piece (14), and each of a cold water flowing hole (147) and a hot water flowing hole (148) is respectively formed at two lateral sides of the central portion of the fixing valve piece (14). The valve base (15) comprises a main portion (151) which is formed inside the valve shell (11) to provide blocking effect for the fixing valve piece (14), and an extending portion (152) protruding from the valve shell (11) has a slot-shaped water outlet chamber. The water outlet chamber comprises a first water outlet channel (153) and a second water outlet channel (154), which are arranged in a sleeve structure. The main portion (151) comprises two cold and hot water inlet holes (155) and a filtered water inlet hole (156) downwardly penetrating the extending portion (152) are configured to receive cold and hot water sources (50) and a filtered water source (60) respectively. The main portion (151) also comprises a tap water outlet hole (157) and a filtered water outlet hole (158) upwardly penetrating the water outlet chamber respectively. By respectively connecting the tap water outlet hole (157) and the filtered water outlet hole (158) to the first water outlet channel (153) and the second water outlet channel (154), the cold and hot water and the filtered water can be separated effectively before flowing into the water outlet chamber. When the main portion (151) of the valve base (15) is secured on the lower end of the valve shell (11), the fixing valve piece (14) can be loaded on the valve base (15). As a result, the two cold and hot water inlet holes (155), the filtered water inlet hole (156), the tap water outlet hole (157), and the filtered water outlet hole (158), which are formed on the valve base (15), are respectively aligned with the cold water flowing hole (147), the hot water flowing hole (148), the second water sink (141), the tap water inlet (146), and the second filtered water inlet (145), which are formed on the fixing valve piece (14). The faucet unit (20) comprises a hollow main body (21), and a valve cartridge base (22) is formed at an outer periphery of the main body (21). The water outlet tube (30) comprises an outer tube (31) and an inner tube (32), and the inner tube (32) is formed inside the outer tube (31).

Figure 8:
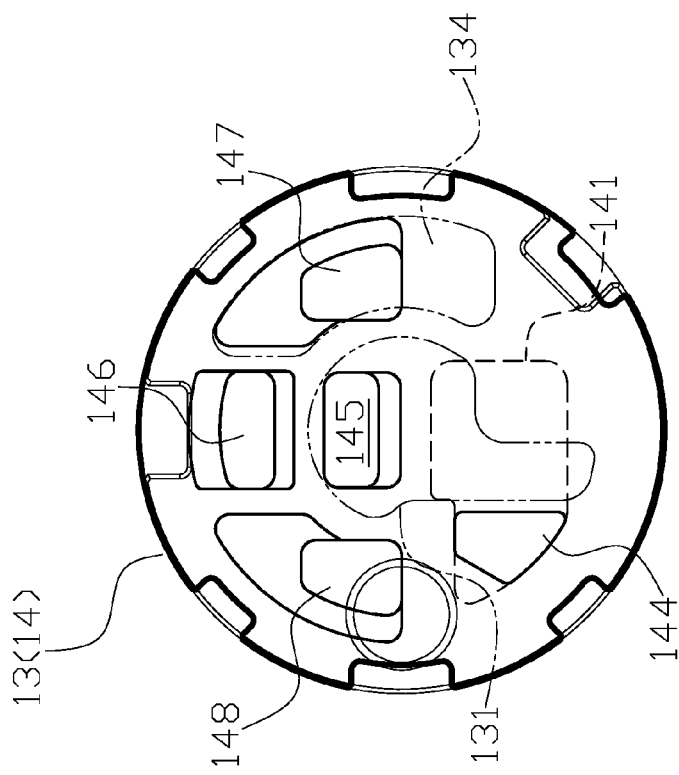
FIG. 8 is a relative diagram of aligning positions between the sliding valve piece and the fixing valve piece when the faucet of the present invention is closed.

In actual application, the control valve (10) is installed in the valve cartridge base (22) of the faucet unit (20), and thus the valve base (15) of the control valve (10) can be located at an inner space of the main body (21). Also, since the main body (21) of the faucet unit (20) is a hollow tube, the valve base (15) can connect to the cold and hot water sources (50), the filtered water source (60), and the water outlet tube (30). Further, the first water outlet channel (153) and the second water outlet channel (154), which are formed on the valve base (15), are respectively connected to the outer tube (31) and the inner tube (32), which are formed on the water outlet tube (30) (as shown in FIGS. 1 to 7). Moreover, the control valve (10) is connected to the handle (40) through the valve rod (121). By rotating the handle (40), the faucet unit (20) can provide tap water. Also, when filtered water is conducted into the control valve (10), the faucet can provide filtered water flowing from the control valve (10) through the inner tube (32) of the water outlet tube (30) out of the faucet unit (20). Furthermore, the faucet can control the mixing ratios of hot water and cold water to provide the warm water with a proper temperature. Before the handle (40) is rotated, the valve rod (121) is located at a central position, so that the first water sink (131) and the water mixing chamber (134), which are formed on the sliding valve piece (13), are misaligned with the first filtered water inlet (144) and the tap water inlet (146), which are formed on the fixing valve piece (14) (as shown in FIG. 8). Thus, cold water, hot water and filtered water are blocked off, and the faucet unit (20) is closed.

Figure 9:
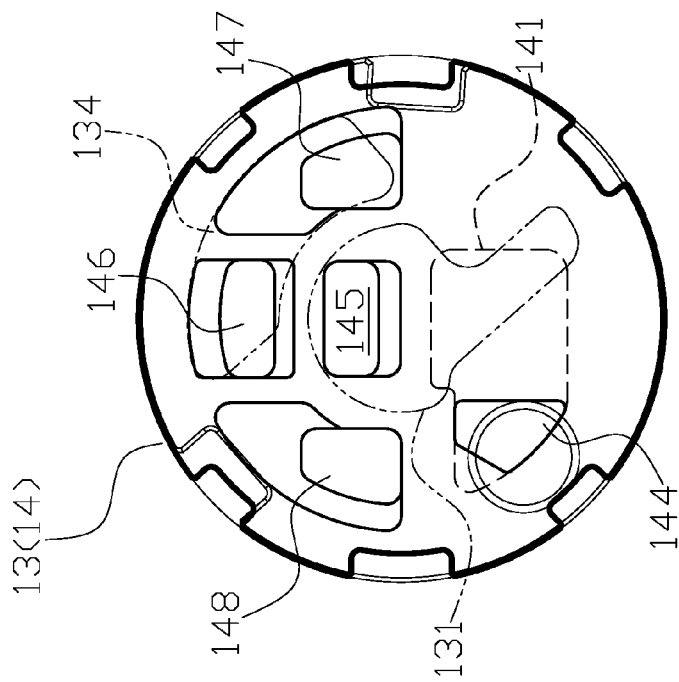
FIG. 9 is a schematic view of aligning positions between the sliding valve piece and the fixing valve piece when the faucet of the present invention only provides cold water.
Figure 10:
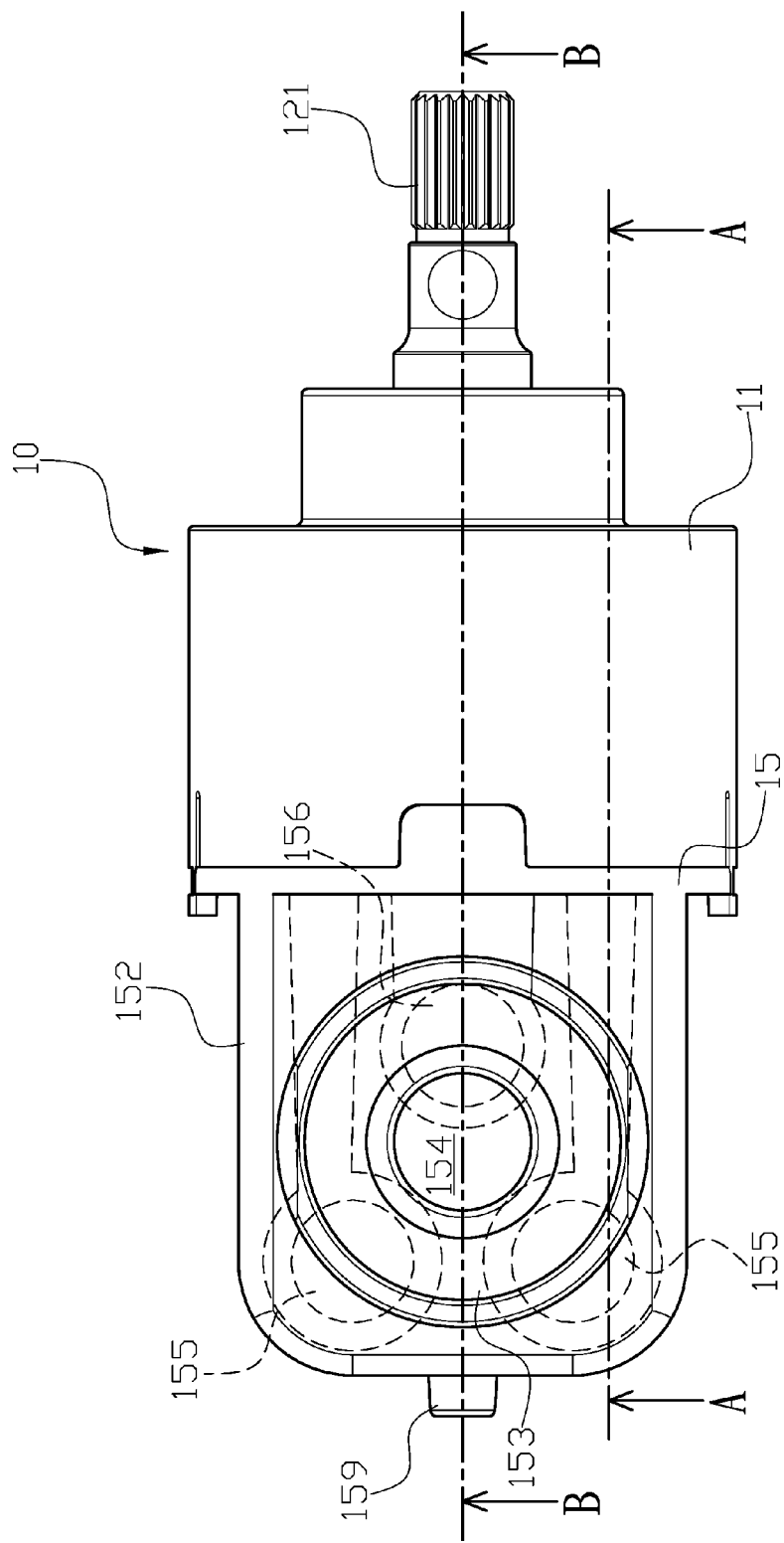
FIG. 10 is a plane view of the control valve of the faucet in the present invention.
Figure 11:
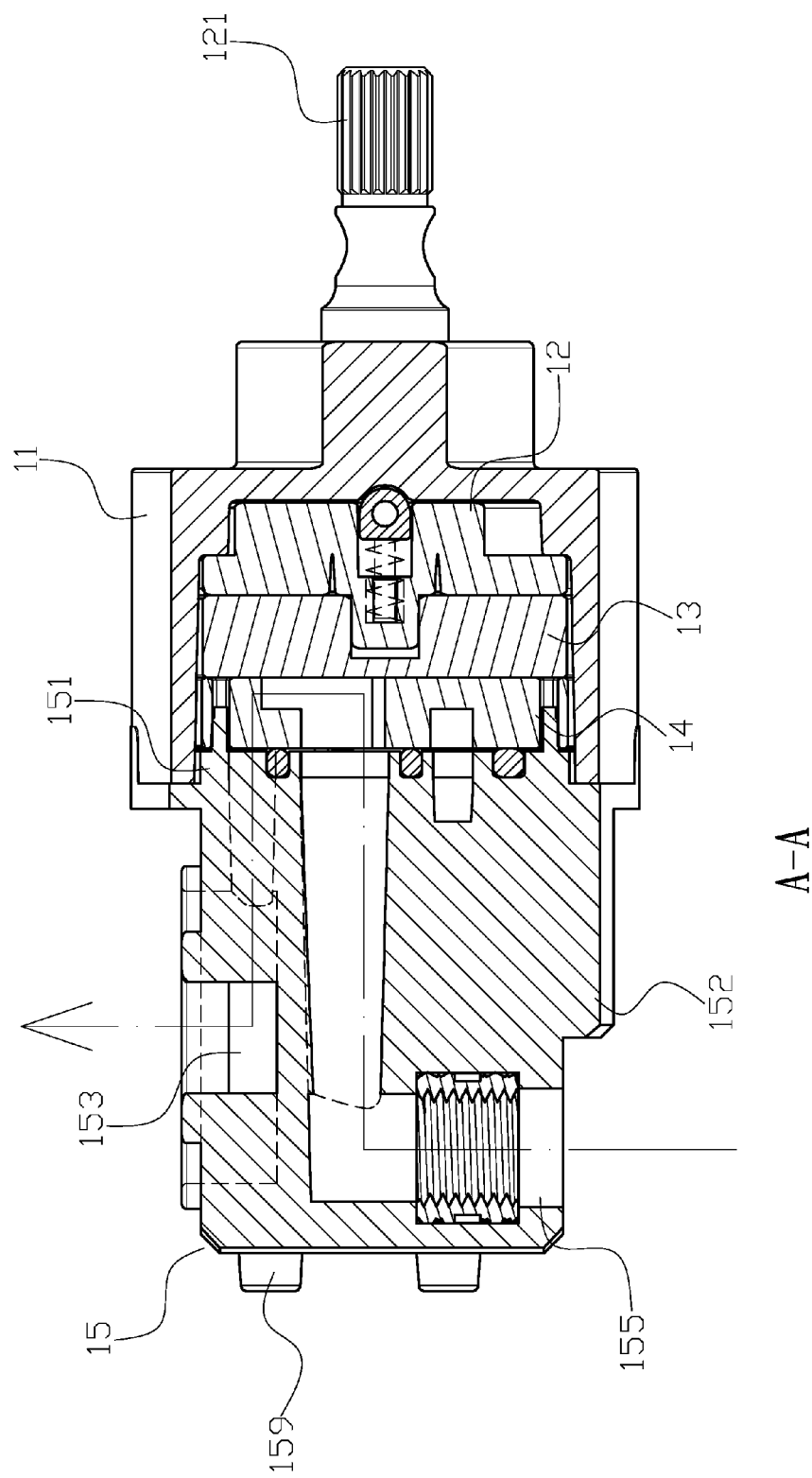
FIG. 11 is a sectional view along line A-A of the FIG. 10 when the faucet provides tap water.
Figure 13:
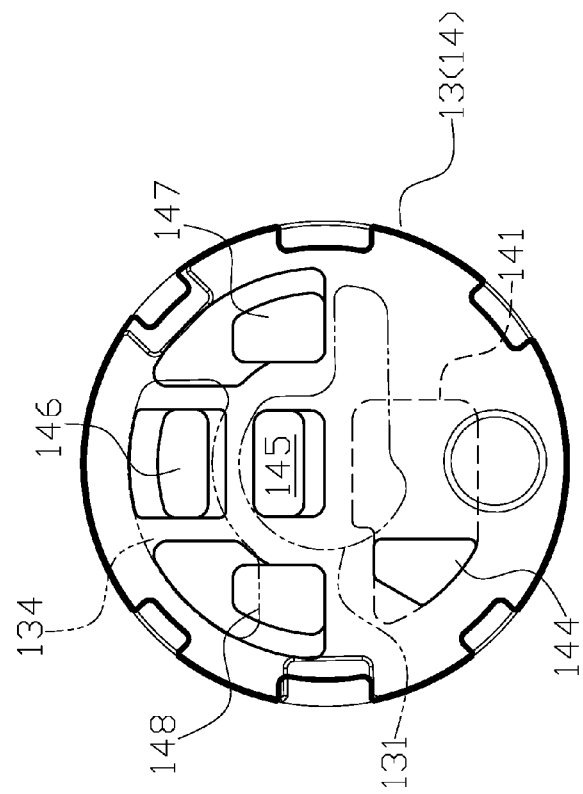
FIG. 13 is a schematic view of aligning positions between the sliding valve piece and the fixing valve piece when the faucet of the present invention only provides hot water.
Figure 12:
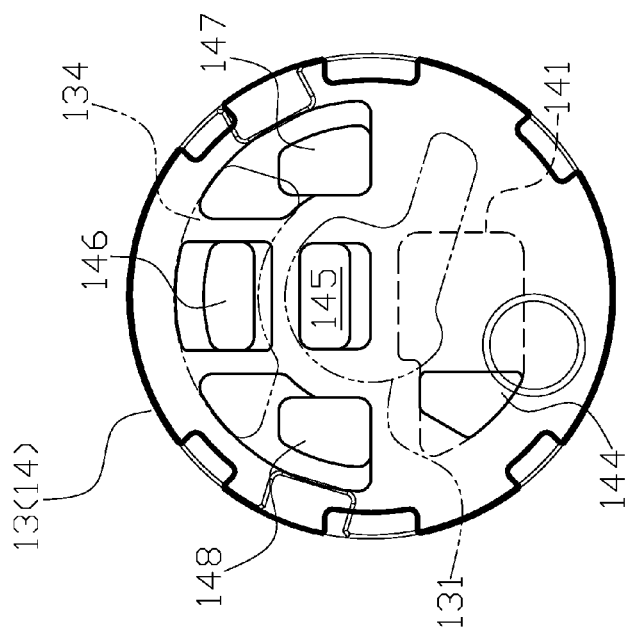
FIG. 12 is a schematic view of aligning positions between the sliding valve piece and the fixing valve piece when the faucet of the present invention provides warm water which is mixed by cold water and hot water.

The faucet can provide tap water, when the handle (40) is rotated in a first direction, and the rotating base (12) driven by the valve rod (121) can rotate with the sliding valve piece (13) simultaneously. By aligning the water mixing chamber (134) with the cold water flowing hole (147) and the tap water inlet (146), the cold water flows from one of the cold and hot water inlet holes (155) through the cold water flowing hole (147), water mixing chamber (134), and the tap water inlet (146) into the valve base (15), and flows from the tap water outlet hole (157) of the valve base (15) through the first water outlet channel (153), and the outer tube (31) of the water outlet tube (30) out of the faucet (as shown in FIGS. 9 to 11). Since the rotation of the sliding valve piece (13) cannot align the first water sink (131) with the first filtered water inlet (144), the filtered water cannot flow from first water sink (131) through the second filtered water inlet (145), the filtered water outlet hole (158), and the second water outlet channel (154), and flows out of the faucet through the inner tube (32) of the water outlet tube (30). Furthermore, the faucet can provide the warm water or even hot water when the handle is rotated with larger angles, and the water mixing chamber (134) is gradually aligned with the hot water flowing hole (148). Thus, the faucet can provide different mixing ratios of cold water and hot water when the handle is rotated with different angles in the first direction to align the water mixing chamber (134) with the cold water flowing hole (147), the tap water inlet (146) and the hot water flowing hole (148) (as shown in FIG. 12). Also, the faucet can only provide hot water, when the handle (40) is rotated with a maximum angle in the first direction. As a result, the water mixing chamber (134) is totally misaligned with the cold water flowing hole (147), and is only aligned with the hot water flowing hole (148) (as shown in FIG. 13). Furthermore, the faucet is closed when the handle (40) is rotated back to initial position.

Figure 14:
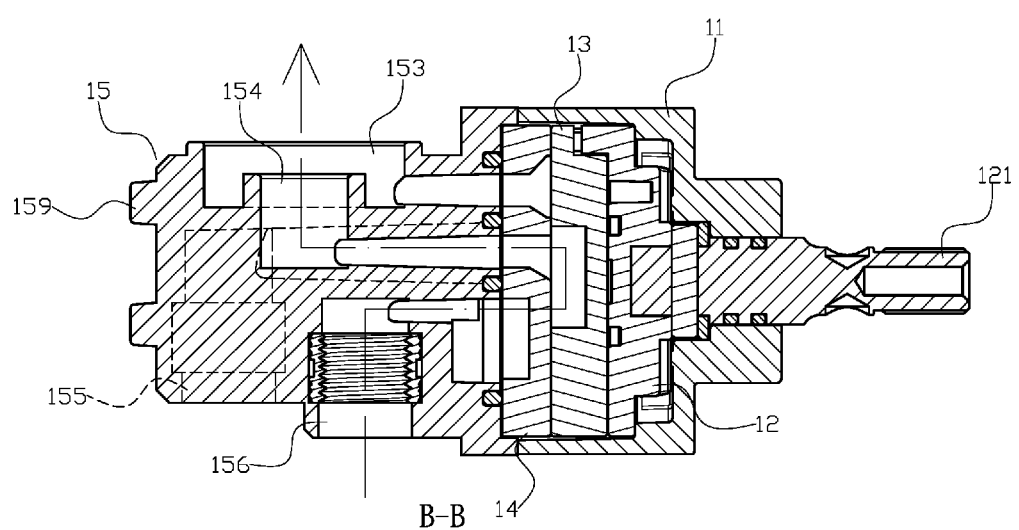
FIG. 14 is a sectional view along line B-B of the FIG. 10 when the faucet provides tap water.
Figure 15:
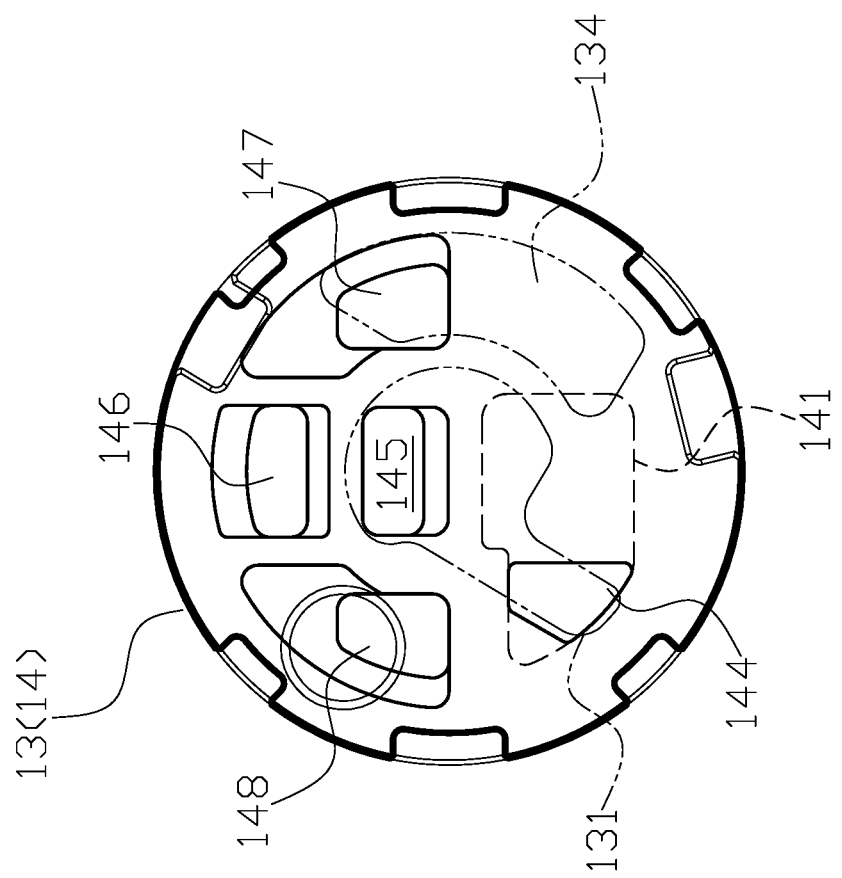
FIG. 15 is a schematic view of aligning positions between the sliding valve piece and the fixing valve piece when the faucet of the present invention only provides filtered water.
Figure 16:
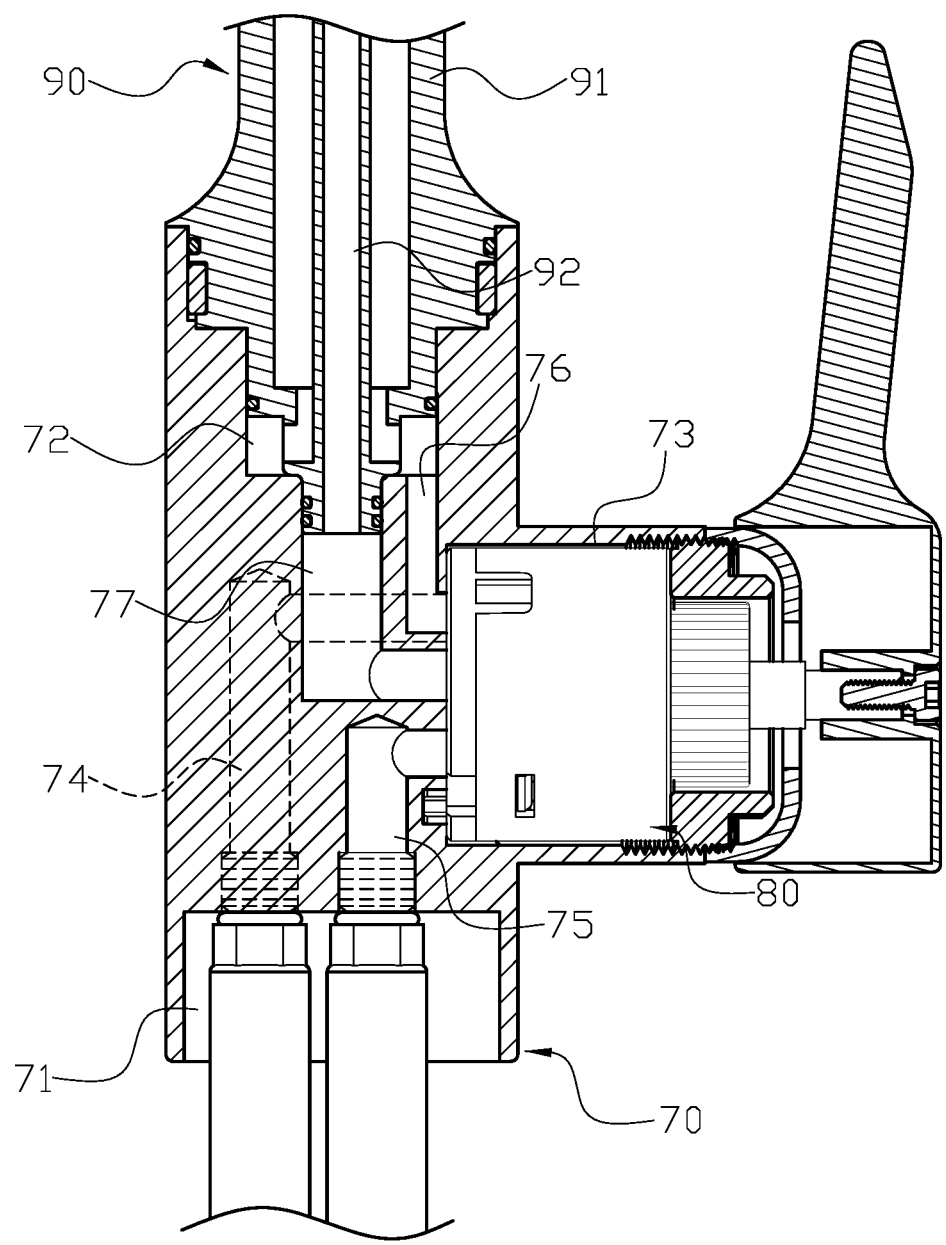
FIG. 16 is a prior art.

On the other hand, the faucet can provide the filtered water when the handle (40) is rotated in a second direction. The rotating base (12) driven by the valve rod (121) is rotated with the sliding valve piece (13) in the second direction, so that the first water sink (131) is aligned with the first filtered water inlet (144) and the second filtered water inlet (145) simultaneously. Thus, the filtered water flows from the filtered water inlet hole (156) through the first filtered water inlet (144), the first water sink (131), the second filtered water inlet (145), the filtered water outlet hole (158) and the second water outlet channel (154), and flows out of the faucet through the inner tube (32) of the water outlet tube (30) (as shown in FIG. 10, FIG. 14 and FIG. 15). By controlling the aligning positions between the sliding valve piece (13) and the fixing valve piece (14), the cold and hot water sources (50) and the filtered water source (60) can be fully separated in the valve base (15), so that tap water can properly flow out of the inner tube (32) of the water outlet tube (30).

In one embodiment, the valve base (15) is integrally formed of plastic material.

In another embodiment, a locating unit (122) is formed on the rotating base (12), and comprises a locating bolt and a spring.

In still another embodiment, the first water sink (131) has the first sink portion (132) and the second sink portion (133), and a dimension of the first sink portion (132) is larger than the second sink portion (133).

In a further embodiment, the second water sink (141) has the third sink portion (142) and the fourth sink portion (143), and a dimension of the third sink portion (142) is larger than the fourth sink portion (143).

In still a further embodiment, a dimension of the fourth sink portion (143) of the fixing valve piece (14) is slightly larger than the first filtered water inlet (144) of the fixing valve piece (14).

In yet a further embodiment, a first end of the extending portion (152) which is a far end from the main portion (151) has at least two locating pins (159), and an inner wall of the main body (21) of the faucet unit (20) has at least two concave locating holes (23). When the valve base (15) with the control valve (10) is secured in the main body (21), the locating pins (159) are engaged with the locating holes (23). As a result, the extending portion (152) of the valve base (15) which protrudes from the valve shell (11) can be secured inside the main body (21).

In a particular embodiment, the water outlet tube (30) is connected with the valve base (15) through a connecting portion (33).

Comparing with conventional faucet, the present invention is advantageous because: (i) since the main body (21) of the faucet unit (20) is a hollow tube, there is no need to have a second or more manufacturing processes for numerous water channels inside the faucet unit (20) after the faucet unit (20) is casted, resulting in simplifying the complexity in structure; (ii) since the valve base (15) is formed integrally, the main portion (151), the extending portion (152), the first water outlet channel (153), the second water outlet channel (154), the two cold and hot water inlet holes (155), the filtered water inlet hole (156), the tap water outlet hole (157), and the filtered water outlet hole (158) are formed simultaneously when the valve base (15) is formed from the mold. Therefore, there is also no need to have second or more manufacturing processes, resulting in lowering the cost; and (iii) the faucet can provide tap water with different mixing ratios of cold water and hot water, and filtered water by using a single control valve (10).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A faucet with pipe-in-pipe structure comprising, a control valve and a valve shell, and a rotating base, a sliding valve piece and a fixing valve piece sequentially formed inside the valve shell, the rotating base having a valve rod which outwardly sticks out of the valve shell to connect to a handle, and the valve rod operated by the handle being able to rotate the rotating base with the sliding valve piece, so that relative positions between the sliding valve piece and the fixing valve piece are controlled to operate the on/off operation of the faucet, the mixing ratios of hot water and cold water, and the amount of water flow, and a valve base, which is connected to a lower end of the valve shell, configured to prevent the fixing valve piece, the sliding valve piece and the rotating base from falling out of the valve shell, and the control valve cooperatively used with a faucet unit, a water outlet tube and the handle;

wherein the sliding valve piece has a first water sink and a water mixing chamber respectively formed on an upper surface thereof in a concave way, and the first water sink located at a central portion of the sliding valve piece comprises a first sink portion and a second sink portion, and the water mixing chamber shaped into an arc-shaped is located at an outer periphery of the first water sink, wherein a lower end surface of the first water sink and a lower end surface of the water mixing chamber respectively bear against an upper surface of the fixing valve piece, so that the sliding valve piece is able to be driven by the rotating base to rotate inside the valve shell;

wherein the fixing valve piece has a second water sink formed on the upper surface thereof, and a concave third sink portion and a concave fourth sink portion are respectively formed on the second water sink, and a first filtered water inlet penetrates through the fourth sink portion, wherein a lower surface of the fixing valve piece is borne against the valve base, and thus the fixing valve piece is able to be secured by engaging portions of the valve base, and a second filtered water inlet and a tap water inlet respectively penetrate through a central portion of the fixing valve piece, and each of a cold water flowing hole and a hot water flowing hole is respectively formed at two lateral sides of the central portion of the fixing valve piece;

wherein the valve base comprises a main portion which is formed inside the valve shell to provide blocking effect for the fixing valve piece, and an extending portion protruding from the valve shell has a slot-shaped water outlet chamber, and the water outlet chamber comprises a first water outlet channel and a second water outlet channel, which are arranged in a sleeve structure, wherein the main portion comprises two cold and hot water inlet holes and a filtered water inlet hole downwardly penetrating the extending portion are configured to receive cold and hot water sources and a filtered water source respectively, and the main portion also comprises a tap water outlet hole and a filtered water outlet hole upwardly penetrating the water outlet chamber respectively, wherein by respectively connecting the tap water outlet hole and the filtered water outlet hole to the first water outlet channel and the second water outlet channel, the cold and hot water and the filtered water are able to be separated effectively before flowing into the water outlet chamber, wherein when the main portion of the valve base is secured on the lower end of the valve shell, the fixing valve piece is able to be loaded on the valve base, as a result, the two cold and hot water inlet holes, the filtered water inlet hole, the tap water outlet hole and the filtered water outlet hole, which are formed on the valve base, are respectively aligned with the cold water flowing hole, the hot water flowing hole, the second water sink, the tap water inlet and the second filtered water inlet, which are formed on the fixing valve piece;

wherein the faucet unit comprises a hollow main body, and a valve cartridge base is formed at an outer periphery of the main body, and the water outlet tube comprises an outer tube and an inner tube, and the inner tube is formed inside the outer tube; and wherein in actual application, the control valve is installed in the valve cartridge base of the faucet unit, and thus the valve base of the control valve is able to be located at an inner space of the main body, and since the main body of the faucet unit is a hollow tube, the valve base is able to connect to the cold and hot water sources, the filtered water source and the water outlet tube, and also the first water outlet channel and the second water outlet channel, which are formed on the valve base, are respectively connected to the outer tube and the inner tube, which are formed on the water outlet tube, wherein the control valve is connected to the handle through the valve rod, and by rotating the handle, the faucet unit is able to provide tap water, and, further, when filtered water is conducted into the control valve, the faucet is able to provide filtered water flowing from the control valve through the inner tube of the water outlet tube out of the faucet unit, and the faucet is able to control the mixing ratios of hot water and cold water to provide the warm water with a proper temperature, wherein before the handle is rotated, the valve rod is located at a central position, so that the first water sink and the water mixing chamber, which are formed on the sliding valve piece, are misaligned with the first filtered water inlet and the tap water inlet, which are formed on the fixing valve piece, thus, cold water, hot water and filtered water are blocked off, and the faucet unit is closed.

2. The faucet with pipe-in-pipe structure of claim 1, wherein the valve base is integrally formed of plastic material.

3. The faucet with pipe-in-pipe structure of claim 1, wherein a locating unit is formed on the rotating base, and comprises a locating bolt and a spring.

4. The faucet with pipe-in-pipe structure of claim 1, wherein the first water sink has the first sink portion and the second sink portion, and a dimension of the first sink portion is larger than the second sink portion.

5. The faucet with pipe-in-pipe structure of claim 1, wherein the second water sink has the third sink portion and the fourth sink portion, and a dimension of the third sink portion is larger than the fourth sink portion.

6. The faucet with pipe-in-pipe structure of claim 1, wherein a dimension of the fourth sink portion of the fixing valve piece is slightly larger than the first filtered water inlet of the fixing valve piece.

7. The faucet with pipe-in-pipe structure of claim 1, wherein a first end of the extending portion which is a far end from the main portion has at least two locating pins, and an inner wall of the main body of the faucet unit has at least two concave locating holes.

8. The faucet with pipe-in-pipe structure of claim 1, wherein the water outlet tube is connected with the valve base through a connecting portion.

* * * * *